April 12, 1949.  J. W. ELSTON  2,466,842
METHOD FOR MAKING SILICA HYDROSOL
Filed Nov. 15, 1945  2 Sheets-Sheet 1

INVENTOR
JAMES W. ELSTON
BY
Semmes, Keegin, Beale and Semmes
ATTORNEYS

April 12, 1949.     J. W. ELSTON     2,466,842
METHOD FOR MAKING SILICA HYDROSOL Filed Nov. 15, 1945     2 Sheets-Sheet 2

INVENTOR
JAMES W. ELSTON
BY
Semmes, Keegin, Beale and Semmes
ATTORNEYS

Patented Apr. 12, 1949

2,466,842

UNITED STATES PATENT OFFICE 2,466,842

METHOD FOR MAKING SILICA HYDROSOL

James W. Elston, Baltimore, Md., assignor to The Davison Chemical Corporation, Baltimore, Md.

Application November 15, 1945, Serial No. 628,724

4 Claims. (Cl. 252—313)

This invention relates in general to silica hydrosols and hydrogels and more particularly has reference to such sols and gels having a high silica content, to methods of preparing the same, and to apparatus employed in the preparation thereof.

Silica hydrosols are generally made by the interaction of an acid, such as sulphuric acid, and a soluble silica compound such as sodium or other alkali metal silicate. One procedure for preparing a silica hydrosol comprised the mixing of sodium silicate of 25° Bé. strength, made by diluting ordinary 40° Bé. sodium silicate of 3¼:1 silica-soda ratio, with 24° Bé. sulphuric acid. This results in a hydrosol containing approximately 8.7% silica. During the reaction resulting in the formation of the hydrosol there is a temperature rise of approximately 10 to 15° F. In actual plant practice, it is found that the temperature of the hydrosol immediately after mixing of the silicate and acid is generally in the range of from about 95 to 105° F.

The capacity of a plant manufacturing silica hydrosol from a silicate, such as sodium silicate, and an acid, such as sulphuric acid, is nearly directly proportional to the silica content in the hydrosol and the resulting hydrogel. By producing a silica hydrosol with a high silica content the amount of water evaporated in drying the resulting hydrogel will be considerably reduced which is an important item in the cost of manufacture. For instance, by increasing the silica content in the hydrosol from 9 to 12% a reduction of about 25% in the quantity of water to be evaporated in drying the resulting hydrogel is effected.

The difficulty in preparing hydrosols of higher silica concentrations in the past has been that precipitation or sludging takes place when the silica content is increased above 9%. This in turn makes the final silica gel white or opaque and of very poor mechanical strength in that it is weak and frangible and easily goes to powder. It is, therefore, important that the hydrosol produced remain absolutely clear so that the resulting hydrogel is firm, tough and strong which makes it easy to handle and wash to obtain a final gel that is clear and transparent and has good mechanical strength.

An object of this invention is to produce a silica hydrosol of high silica content.

Another object of this invention is to effect the rapid setting of silica hydrosol.

A further object of this invention is to produce a clear hydrosol having a high silica content and capable of setting to form a hydrogel in a short time.

Still another object of this invention is to produce a silica hydrosol of high silica content by mixing an alkali metal silicate and an acid in a mixing nozzle made of special materials.

It is also an object of this invention to produce an undried washed silica gel having a high silica content.

Yet another object of this invention is to provide apparatus and methods for the preparation of hydrosols and hydrogels of high silica content in which the hydrosol is formed in a mixing nozzle of which at least the surfaces thereof contacted by the hydrosol are formed of a resinous plastic material.

With these and other objects in view which will appear more fully hereinafter, the present invention resides in silica hydrosols and silica hydrogels having a high silica content and in the method of preparing the same in which a clear silica hydrosol is formed by the mixing of solutions of a strong acid such as sulphuric acid with a solution of an alkali metal silicate such as sodium silicate in a nozzle under such conditions as will avoid the formation of precipitates upon the parts of the apparatus employed in carrying out the procedure.

In order to facilitate an understanding of the present invention reference is made to the accompanying drawings.

While, as hereinbefore pointed out, in the prior art manufacture of silica hydrosol containing more than about 9% silica there was a precipitation of silica which rendered the resulting hydrosol cloudy and the gel prepared therefrom weak, it has been found in accordance with the present invention that hydrosols having a silica content appreciably in excess of 9% by weight may be prepared by effecting the mixing of the acid and silicate solutions in a particular manner and by controlling the conditions under which the mixing is effected.

By employing particular procedures and equipment for mixing the acid and silicate solutions, a marked effect on the resulting product is obtained. For instance, when employing ordinary mixing equipment, the preparation of a clear hydrosol of a silica content higher than ordinary can be effected by using a silicate solution at a predetermined maximum temperature. Furthermore, by effecting the mixing operation in a mixing nozzle a clear silica hydrosol of still higher silica content can be obtained.

Figure 2:
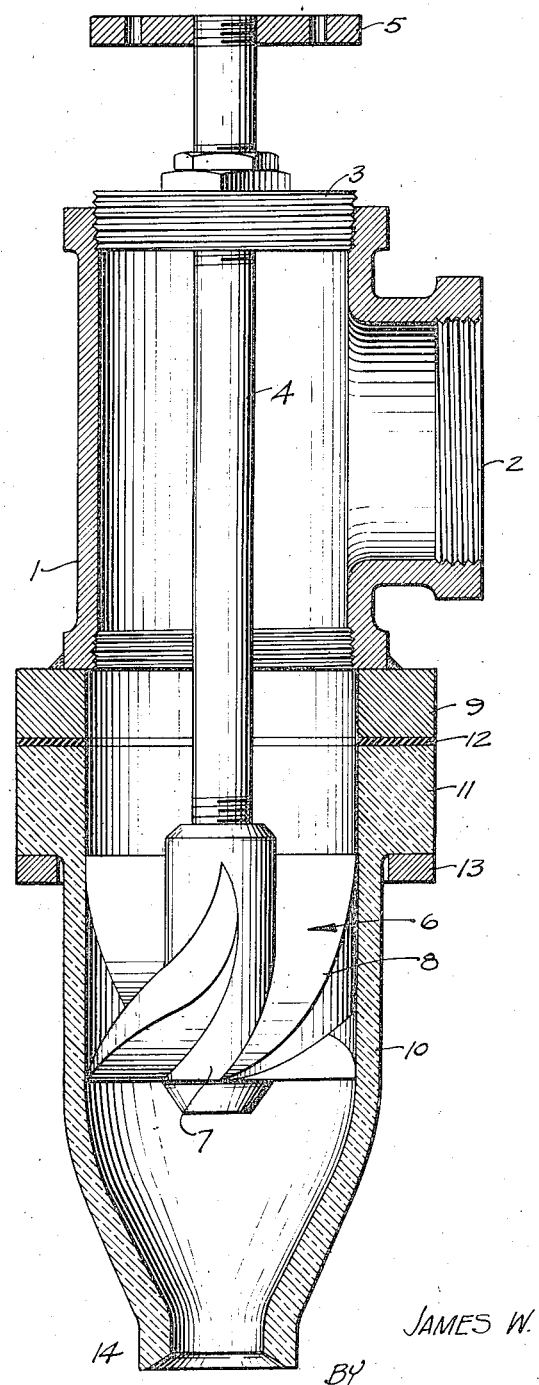
Figure 2 is a vertical sectional view of a mixing nozzle constructed in accordance with the present invention.

A clear silica hydrosol of a silica content higher than that obtainable by the prior art methods can be produced by mixing the acid and silicate solutions in a mixing nozzle. The type of mixing nozzle shown in the drawings is merely for purposes of illustration and example and is not intended as a limitation of the invention. This mixer as shown in Figure 2 of the drawings comprises an outer tubular casing member 1 in the form of a T-fitting. In this instance, the stem of the T-fitting serves as an inlet 2 for supplying a silicate solution to the mixer. A plug 3 is axially bored and threaded to receive an externally threaded tube 4 having a coupling flange 5 on its upper end by means of which the tube may be coupled to an acid supply line. On the lower end of the tube 4 which projects through the lower open end of the fitting 1, is mounted a turbine center 6. This element has an axially bored body 7 which carries a plurality of helical vanes 8.

As illustrated, the lower end of the T-fitting has a coupling flange 9 welded thereto and provided with suitable bolt holes (not illustrated). A nozzle tip 10 having a coupling flange 11 is provided and is secured to the flange 9 with an interposed gasket 12 by means of a clamping ring 13 drawn toward the flange 9 by suitable clamping bolts (not shown). Nozzle tip 10 serves as a continuation of the casing 1 and has a restricted discharge orifice 14. It will be noted that the turbine center 6 is of an external diameter to properly fit within the nozzle tip 10 and to impart a spin to the silicate solution.

Initial contact between the two solutions takes place below the lower end of the turbine center within the tip 10. The space within the tip 10 in which mixing is effected may be termed the mixing chamber.

As the confined stream of silicate solution flows by the turbine center 6 between the blades 8 thereof, a spin is imparted thereto, insuring thorough mixing in the mixing chamber with the acid flowing through the body of the turbine center. Mixing of the two solutions takes place very rapidly in the mixing chamber and is aided by constriction of the streams as they flow through the orifice 14 of the nozzle tip. The intensity and speed of mixing is so high and the proportioning of the reactants such that the mixture in the mixing chamber is acidic.

While the results obtained by mixing the acid and silicate solution in a mixing nozzle of metal construction are much superior to those obtained in prior art mixing procedures, it has been found that by employing special materials in the mixing nozzle construction, the tendency of silica to deposit and build up on the nozzle can be greatly reduced.

In the production of a mass of a hydrosol corresponding to the carrying out of the mixing operation over a period of time of about thirty minutes, it was found that a bronze mixing nozzle became coated with a built-up mass of precipitated silica which had to be removed before carrying on a further operation with the same. It was noted that the precipitate builds up in an area covering the lower portion of the nozzle tip and that the build-up extends from the discharge orifice of the nozzle toward the turbine center. In accordance with the present invention it has been found that by coating the portion of the nozzle tip upon which the precipitate of silica builds up with an acid resisting coating there will be a reduction in the tendency of the silica to precipitate on the surface of the nozzle. For instance, by coating the area of the nozzle tip in question with a phenol formaldehyde resin varnish, the precipitation will be greatly reduced. However, in the course of time it will be found that the coating tends to wear off of the nozzle and that the tendency of the silica to precipitate upon the exposed metal portions of the nozzle will increase.

The coating of the nozzle tip may be effected by polishing the same, dipping the polished surfaces in a solution of a phenol formaldehyde resin varnish in alcohol, drying and baking at a suitable temperature. After cooling, additional coats of the varnish solution may be applied and after final coating the entire coated article should be baked for a required time to polymerize the coating.

By coating the nozzles with a synthetic resin varnish as above described, the nozzle tips may be used over much longer periods of time than the uncoated tips without any build-up of precipitated silica upon the surfaces thereof.

It has further been found in accordance with the present invention that by making the nozzle tip of an acid resisting material such as an organic resinous plastic free from any inert filler that the nozzle could be used over much longer periods of time without any build-up of precipitated silica. Suitable materials for the construction of the nozzle tip are the so-called "Plexiglas" or "Lucite" types of methyl-methacrylate resin. Other non-filled resinous plastics such as phenol formaldehyde, urea formaldehyde and styrene, and others, may be used. The "Plexiglas" or "Lucite" types of methyl-methacrylate resin is particularly suitable because of its transparent nature which makes it easy to ascertain whether or not any filler is present.

It has further been ascertained in accordance with the present invention that the tendency for sludging or build-up to occur may be reduced by having the discharge orifice of the nozzle immersed in a bath of the hydrosol produced in the mixing nozzle. This may be accomplished by having a receiver positioned to surround the lower end of the nozzle and provide it with means for maintaining a constant level of the produced hydrosol therein so that the orifice of the nozzle tip is at all times completely submerged.

Figure 1:
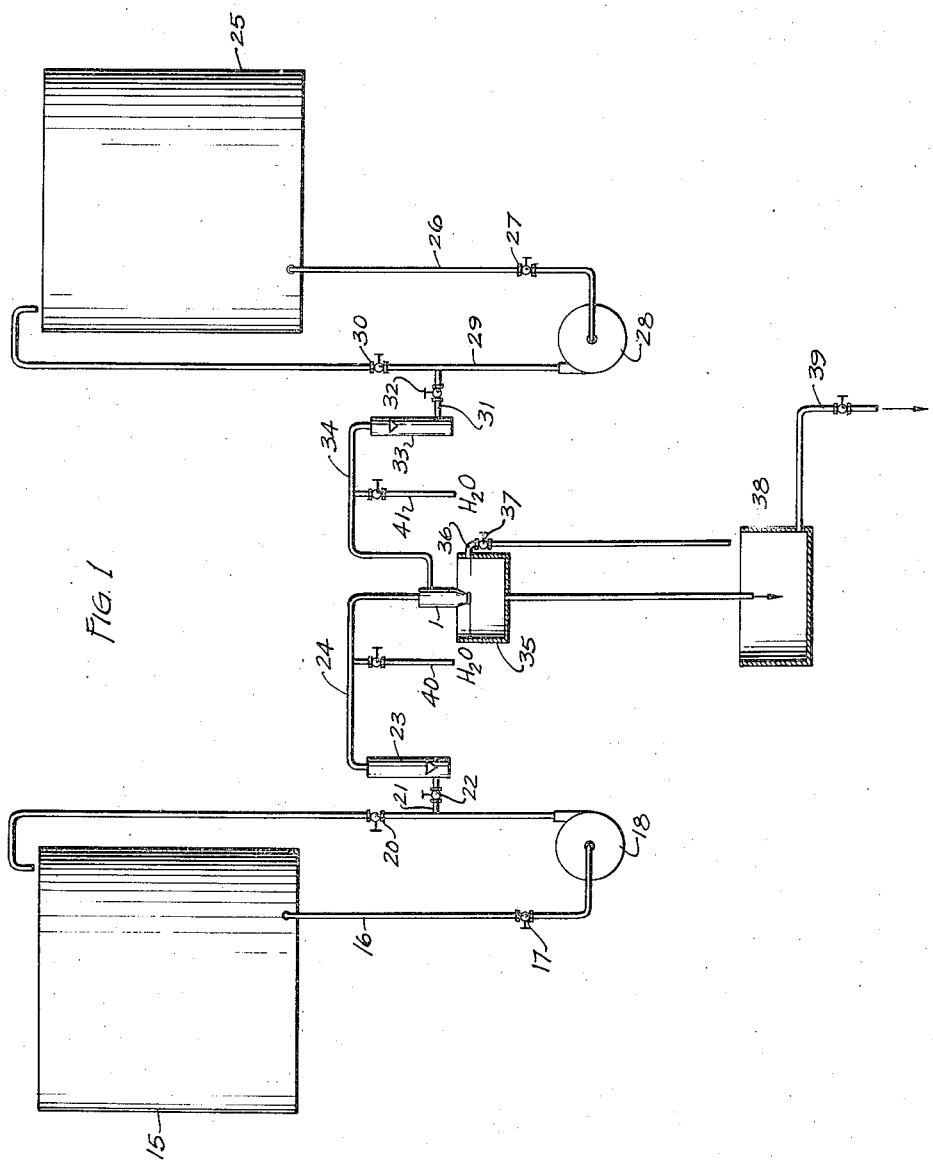
Figure 1 is a diagrammatic arrangement of apparatus for carrying out the process of the present invention.

In preparing a silica hydrosol in accordance with the present invention an arrangement of apparatus similar to that illustrated in Figure 1 of the drawings may be employed. As illustrated, a supply tank 15 is provided for maintaining an adequate supply of a strong mineral acid such as sulphuric acid. At the lower portion of the tank 15 there is provided a discharge conduit 16 having a control valve 17 interposed therein for conveying the acid from the tank to the intake of a suitable pump 18. The acid is forced by the pump 18 up through a conduit 19 provided with a by-pass valve 20. Conduit 19 extends to the upper portion of the tank 15 so that the acid discharged by pump 18 may be returned to the tank 15 if so desired. A take-off conduit 21 provided with a throttling valve 22 is provided for feeding acid from the pump discharge conduit 19 to a rotameter 23 to measure the flow of acid supplied through conduit 24 to the mixing nozzle 1. With the pump 18 running at a speed to produce a constant delivery, the flow of the acid to the mixing nozzle 1 may be controlled by adjusting the throttling valve 22 and the by-pass valve 20.

A solution such as sodium silicate is maintained in a tank 25 provided with an outlet conduit 26 equipped with a valve 27 for suplying a sodium silicate solution to a pump 28. This pump has a discharge conduit 29 equipped with a by-pass valve 30 to enable any desired portion of the sodium silicate solution to be returned to the tank 25. A take-off conduit 31 having a throttling valve 32 therein serves to supply the silicate solution from the conduit 29 to a rotameter 31 from which the silicate solution is discharged through a conduit 34 to the mixing nozzle 1. As hereinbefore indicated, the solutions of acid and sodium silicate are mixed in the nozzle 1 and the resulting mixture discharged into a receiver 35. This receiver may be provided with an overflow orifice 36 provided with a control valve 37 by means of which the level of the hydrosol resulting from the mixture of acid and silicate solutions may be adjusted. The adjustment of valve 37 is such as to maintain the level of the liquid in the receiver 35 just above the tip of the nozzle, thereby resulting in a complete immersion of the nozzle in the bath of hydrosol. Of course, any other type of apparatus for accomplishing this function may be employed.

From receiver 35 the silica hydrosol collected therein flows to a surge tank 38 and from this tank through valve controlled line 39 to setting vessels (not shown) in which the hydrosol is allowed to set for a predetermined time until gelation takes place. After setting or gelation, the hydrogel formed may be removed from the setting vessel, sized, washed, dried and activated.

It will be noted that water supply lines 40, 41 equipped with control valves are provided to enable the lines through which the acid and silicate solutions flow to be flushed out to facilitate shutting down of the plant.

In starting up a plant for the production of a silica hydrosol such as diagrammatically illustrated in Figure 1 of the drawings, the nozzle tip should first be inspected for any precipitate. If any precipitate is present, it should be removed or the nozzle tip replaced. With water running through the lines, the valve in water supply line 40 is closed (valve in line 41 left open) and control valve 17 in the acid supply line is opened. The acid pump 18 should then be started and the flow through the rotameter 23 should be adjusted by controlling the positions of the throttling valve 22 and the by-pass valve 20. After the acid has bee started through the mixing nozzle, the valve 27 is opened and pump 28 should be started to produce a flow of sodium silicate solution with the by-pass valve 30 open and the throttling valve 32 closed. After following this procedure, the throttling valve 32 may be slowly opened to allow the silicate solution to flow through the rotameter into the mixing nozzle with water introduced through line 41. The water flow through line 41 gradually reduced as the silicate solution flow is increased until finally the water is shut off entirely. By adjusting the positions of valves 30 and 32, the desired flow of silicate solution may be obtained. The ratio of acid flow to silicate solution flow may be adjusted by the various valves above mentioned to a predetermined value. In one plant to which the present invention has been applied, the total flow operation was about 70 gallons per minute which filled about two (2) setting tubs per minute.

During the operation of the plant, the level of the mixed solution in the receiving vessel 35 was maintained by adjusting the overflow so that the tip or orifice end of the nozzle is partly immersed.

The operation of the mixing nozzle may be checked by sampling the hydrosol at intervals for clarity and normality determinations. Adjustments of the various valves are made upon a basis of these determinations.

The sequence of operations in shutting down the system is very important, since it is possible to clog the lines rather easily. The silicate flow is diluted by adding water through the water line 41, then the silicate flow is stopped, keeping the water line open to supply water to the nozzle. After 10 to 15 seconds, the acid flow is stopped and the water line 40 is opened to supply water to the acid lines to flush the system well, after which the spray nozzle is inspected for precipitate.

As an example, a silica sol containing about 17½% silica by weight was produced from 36° Bé. sulphuric acid and 32.5° Bé. sodium silicate solution mixed together in a mixing nozzle in proportions to produce an excess acidity of ½ normal. In effecting the mixing of the acid and silicate solutions, the temperature of the acid should not exceed a maximum of up to 145° F. and the silicate solution should not exceed a maximum temperature of up to about 90° F. These maximum temperatures can be employed for the acid and silicate solutions without effecting precipitation or clouding of the resulting sol produced therefrom. Upon allowing the silica hydrosol obtained by mixing the above-mentioned ingredients to set or gel, a silica hydrogel was obtained which after washing and prior to drying had a silica content of about 25 to 28% by weight.

It will be realized that it will be fairly easy to maintain the temperatures of the reacting solutions below the maximum permissible temperature limits since in many instances the ambient temperatures of the solutions will be low enough. In cases where the ambient temperatures are too high, cooling may be resorted to. As the upper limit of the acid solution is much higher than ordinarily encountered, it is necessary to cool only the silicate solution.

As a still further example of the present invention, a silica hydrosol was made by mixing in a nozzle similar to that shown in the drawing in proportions to form a hydrosol having an excess acidity of about 0.35 N., a (37.0° Bé. at 60° F.) solution of sulphuric acid at 75° F., a (32.2° Bé. at 60° F.) solution of sodium silicate at 59° F. The hydrosol produced was clear and had a silica content of about 18.1% by weight. In another instance, clear silica hydrosols containing about 19% and 20% silica by weight were formed.

If the above-mentioned figures are evaluated, it will be seen that the acid consumption has been reduced to less than about 40%. The requirement of water evaporation of the washed hydrosol has been reduced over about 35%. In addition, it is possible to reduce the wash water consumption of the washed hydrosol about 55%.

It is also within the concept of the present invention to construct the mixing nozzle, especially the tip, of glass or porcelain enamel coated steel. In the case of a glass construction, the glass should be of a type resistant to acid so that there will be a minimum amount of erosion or chemical action between the glass and the silica sol or the substances from which the sol is formed. Likewise, in the case of the porcelain enamel coated steel nozzle or nozzle tip, the enamel should be of a type resistant to acid. When a nozzle or nozzle tip is formed of glass or porcelain enamel coated steel or when formed of the resins as hereinbefore stated, it should have a smooth polished-simulating finish to avoid the presence of any roughness upon which deposition would occur.

Another feature of the present invention resides in the reduction in the time for setting the hydrosol into a hydrogel. For instance, a hydrosol having a high silica content of 14 to 15% by weight at a temperature of about 110° F. will be set in about half an hour, whereas a hydrosol under substantially the same conditions of 1.0 N. acidity but containing only 9% silica would require 24 hours for setting into a hydrogel. With 2.0 N. acidity and about 9% silica content, which has been normal plant practice in the past, the normal setting time is from four to six hours. The increase in silica concentration and the decrease in the setting time is a considerable advantage in the manufacture of a hydrogel, first because of the increased plant capacity, the setting capacity being increased from five to ten times and the washing and drying capacity being increased over 50%, and, secondly, in the character of the hydrogel. The high silica hydrosol results in the production of a hydrogel which is considerably tougher than the gels prepared from sols of low silica content which in turn results in a low percentage of fines.

While it will be gathered that in accordance with the present invention the temperature of the silicate solution is critical whereas that of the acid is not, it has been considered that the reduction in the acid temperature would affect the process. Contrary to expectations, by reducing the acid temperature, it has been found that there is no improvement in that the concentration of the sol cannot be increased and on the other hand there is a disadvantage in that the time for setting of the resulting hydrosol (which is at a lower temperature) is increased unless the hydrosol is subsequently raised in temperature, which is an additional complication.

One advantage of this invention is that by only cooling the silicate solution and leaving the acid at as high a temperature as workable the high silica hydrosol can be satisfactorily produced and yet the temperature of the mixture (resulting hydrosol) is not greatly lowered. This is very important and enables the setting of the hydrosol into a gel to be rapidly effected without heating of the hydrosol.

Another important aspect of the present invention resides in the fact that heretofore it was necessary to have an excess acid concentration in the hydrosol of about 2.0 N. In accordance with the present invention, it has been found that the normality of the mixture may be reduced to as low as 1.0 N., ½ N., 0.35 N. or less without detrimentally affecting the process or the product. Obviously, this results in a considerable saving in the acid employed in the process, in fact, it reduces the acid consumption to one-half or less of that previously required. The combined effects of raw material saving, high quality product and low plant cost, both from the standpoint of first cost and operating cost, make the results of this invention of great commercial importance.

The importance and value of the present invention will be appreciated from the foregoing description and especially when it is considered that the present invention provides for the production of a clear silica sol of a silica content over 100% higher than was heretofore possible and the production of a silica gel which in the undried washed stage has a silica content as high as 30% by weight.

I claim:

1. A method of producing a clear silica hydrosol containing about 14–20% by weight of silica comprising mixing a solution of an alkali metal silicate with an inorganic acid in a mixing nozzle to form a hydrosol, at least the surfaces of the nozzle in contact with the hydrosol formed of a smooth, acid resisting material, and discharging the hydrosol from the nozzle under the surface of a bath of the hydrosol.

2. A method of producing clear silica hydrosol containing about 14–20% by weight of silica comprising mixing a solution of an alkali metal silicate with an inorganic acid in a mixing nozzle to form a hydrosol, at least the surfaces of the nozzle in contact with the hydrosol being of acid-resisting, organic plastic, and discharging the hydrosol from the nozzle under the surface of a bath of the hydrosol.

3. A method of producing a clear silica hydrosol containing about 14–20% by weight of silica comprising mixing a solution of an alkali metal silicate with an inorganic acid in a mixing nozzle to form a hydrosol, at least the surfaces of the nozzle in contact with the hydrosol being of glass, and discharging the hydrosol from the nozzle under the surface of a bath of the hydrosol.

4. A method of producing a clear silica hydrosol containing about 14–20% by weight of silica comprising mixing a solution of an alkali metal silicate with an inorganic acid in a mixing nozzle to form a hydrosol, at least the surfaces of the nozzle in contact with the hydrosol being of porcelain enamel, and discharging the hydrosol from the nozzle under the surface of a bath of the hydrosol.

JAMES W. ELSTON.

REFERENCES CITED

The following references are of record in the file of this patent:

UNITED STATES PATENTS

| Number | Name | Date |
|---|---|---|
| 1,756,625 | Behrman | Apr. 29, 1930 |
| 2,232,727 | Peterkin | Feb. 25, 1941 |
| 2,326,523 | Connolly | Aug. 10, 1943 |
| 2,386,810 | Marisic | Oct. 16, 1945 |
| 2,446,783 | Payne | Aug. 10, 1948 |